United States Patent
Chin et al.

(10) Patent No.: US 9,609,712 B2
(45) Date of Patent: Mar. 28, 2017

(54) SIGNAL GENERATING METHOD AND CIRCUIT FOR CONTROLLING DIMMING OF LED

(71) Applicant: SILICON TOUCH TECHNOLOGY INC., Hsinchu (TW)

(72) Inventors: Chi-Yuan Chin, Hsinchu (TW); Kuei-Jyun Chen, Hsinchu (TW)

(73) Assignee: SILICON TOUCH TECHNOLOGY INC., Hsinchu (TW)

( * ) Notice: Subject to any disclaimer, the term of this patent is extended or adjusted under 35 U.S.C. 154(b) by 0 days.

(21) Appl. No.: 15/071,139

(22) Filed: Mar. 15, 2016

(65) Prior Publication Data

US 2017/0006679 A1 Jan. 5, 2017

(30) Foreign Application Priority Data

Jul. 3, 2015 (TW) .............................. 104121653 A

(51) Int. Cl.
*H05B 37/02* (2006.01)
*H05B 33/08* (2006.01)

(52) U.S. Cl.
CPC ..... *H05B 33/0845* (2013.01); *H05B 33/0815* (2013.01)

(58) Field of Classification Search
CPC .................................................. H05B 33/0845
USPC .................................. 315/246, 291; 345/690
See application file for complete search history.

(56) References Cited

U.S. PATENT DOCUMENTS

| 7,009,440 B2 * | 3/2006 | Nogawa | G09G 3/2014 327/291 |
| 7,663,589 B2 * | 2/2010 | Ha | G09G 3/2011 345/36 |
| 8,363,004 B2 * | 1/2013 | Ye | G09G 3/006 315/291 |
| 2008/0079371 A1 | 4/2008 | Kang et al. | |
| 2012/0038288 A1 | 2/2012 | Bai et al. | |

FOREIGN PATENT DOCUMENTS

| TW | I400000 | 6/2013 |
| TW | I432092 B | 3/2014 |

* cited by examiner

*Primary Examiner* — Thuy Vinh Tran
(74) *Attorney, Agent, or Firm* — Li&Cai Intellectual Property (USA) Office

(57) ABSTRACT

The present disclosure provides a signal generating method and a circuit for controlling dimming of an LED. The method comprises generating a first pulse signal, the first pulse signal comprising information of P bits gray levels, P being an integer, wherein the minimum pulse-width of the first pulse is N, N is an integer; generating a second pulse signal after the first pulse signal, the second pulse signal comprising information of Q bits gray levels, Q being an integer, wherein the amplitude of the second pulse signal is different from the amplitude of the first pulse signal, the minimum pulse-width of the second pulse is the same as the minimum pulse-width of the first pulse; and utilizing the first pulse signal and the second pulse signal to represent gray levels information of the LED.

14 Claims, 3 Drawing Sheets

SIGNAL GENERATING METHOD AND CIRCUIT FOR CONTROLLING DIMMING OF LED

BACKGROUND OF THE INVENTION

1. Field of the Invention

The instant disclosure relates to a light emitting diode (LED); in particular, to a signal generating method and a circuit for controlling dimming of the LED.

2. Description of Related Art

A conventional method for controlling dimming of an LED is generating a pulse width modulation (PWM) signal for switching the transistor connected to the LED. A conventional pulse width modulation signal is shown in FIG. 1A. The duty ratio D shown in FIG. 1 is determined by control bits. Based on cost down considerations, the frequency of the pulse width modulation signal is not high, such that the length T of the pulse width modulation signal is longer when more control bits are used. For a case of LED display controlled by control bits of 16-bits, the minimum pulse-width of the pulse width modulation signal is N (N is an integer), the duty ratio can be changed by an interval of the length of 1/N. Thus, the pulse width modulation signal can correspond to 65536 gray levels by changing the duty ratio D from minimum duty ratio (which is zero) to the maximum Dmax (which is the length T), as shown in FIG. 1B. Accordingly, the length T of the pulse width modulation signal would certainly be long, and it will take more time to display a frame. As a result, the frame rate (or frame frequency) would be quite low.

SUMMARY OF THE INVENTION

The object of the instant disclosure is to provide a signal generating method and a circuit for controlling dimming of an LED. The method and the circuit can combine two types of signals to generate a mixed pulse signal, for controlling dimming of the LED.

In order to achieve the aforementioned objects, according to an embodiment of the instant disclosure, a signal generating method for controlling dimming of an LED is provided. The method comprises the following steps. At first, generating a first pulse signal. The first pulse signal comprises information of P bits gray levels. P is an integer. The minimum pulse-width of the first pulse is N. N is also an integer. Then, generating a second pulse signal after the first pulse signal. The second pulse signal comprises information of Q bits gray levels. Q is an integer. The amplitude of the second pulse signal is different from the amplitude of the first pulse signal. The minimum pulse-width of the second pulse is the same to the minimum pulse-width of the first pulse. Then, utilizing the first pulse signal and the second pulse signal to represent gray levels information of the LED.

In order to achieve the aforementioned objects, according to an embodiment of the instant disclosure, a signal generating circuit for controlling dimming of an LED is provided. The signal generating circuit comprises a pulse generator and a driving circuit. The pulse generator generates a first pulse signal and a second pulse signal after the first pulse signal. The minimum pulse-width of the first pulse is N. N is also an integer. The first pulse signal comprises information of P bits gray levels. P is also an integer. The second pulse signal comprises information of Q bits gray levels. Q is an integer. The amplitude of the second pulse signal is different from the amplitude of the first pulse signal. The driving circuit is coupled to the pulse generator. The driving circuit controls gray levels of the LED according to gray levels information represented by the first pulse signal and the second pulse signal.

In summary, the instant disclosure provides a signal generating method and a circuit for controlling dimming of an LED. By combining two types of pulse signals to generate a mixed pulse width modulation signal, the length of the pulse signal can be greatly shortened, wherein the duty ratio or the amplitude of two types of pulse signal is available to be selected for representing information of the control bits.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 2:
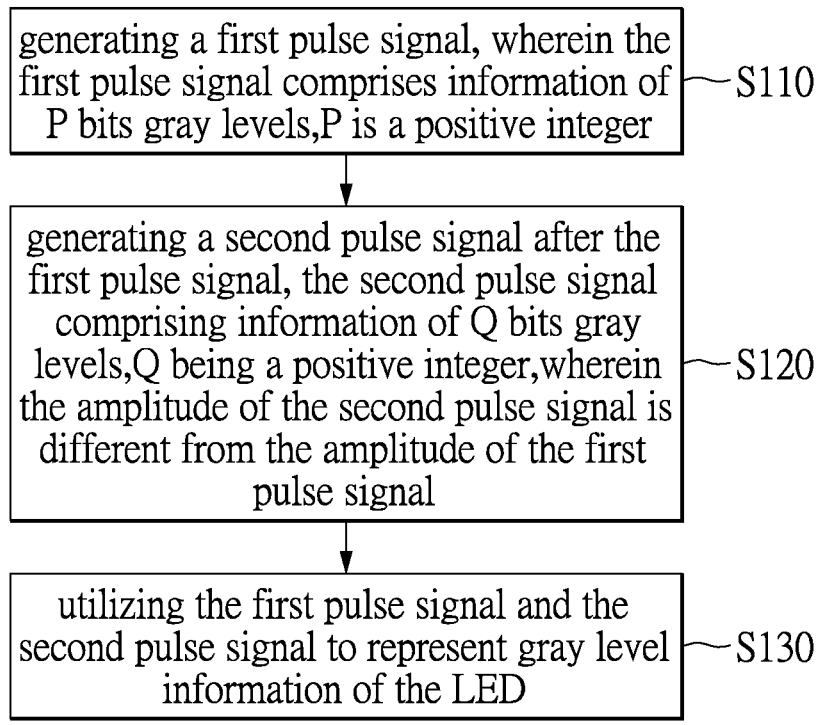
FIG. 2 shows a flow chart of a signal generating method for controlling dimming of an LED according to an embodiment of the instant disclosure.

An Embodiment of a Signal Generating Method for Controlling Dimming of a LED Please refer to FIG. 2 showing a flow chart of a signal generating method for controlling dimming of an LED according to an embodiment of the instant disclosure. At first, in step S110, generating a first pulse signal. The first pulse signal comprises information of P bits gray levels, wherein P is an integer. The minimum pulse-width of the first pulse is N, wherein N is an integer.

Then, in step S120, generating a second pulse signal after the first pulse signal. The second pulse signal comprises information of Q bits gray levels, wherein Q is an integer. The amplitude of the second pulse signal is different from the amplitude of the first pulse signal. And, in practical applications, the minimum pulse-width of the second pulse is the same to the minimum pulse-width of the first pulse.

Then, in step S130, utilizing the first pulse signal and the second pulse signal to represent gray levels information of the LED. Accordingly, the brightness (or so called "gray level") can be determined. In one embodiment, the resolution of the gray levels information of the LED is higher than P bits or Q bits, but lower than or equal to P+Q bits. As for the flow chart shown in FIG. 2, the instant disclosure provides the following embodiments of FIG. 3 and FIG. 4.

Figure 3:
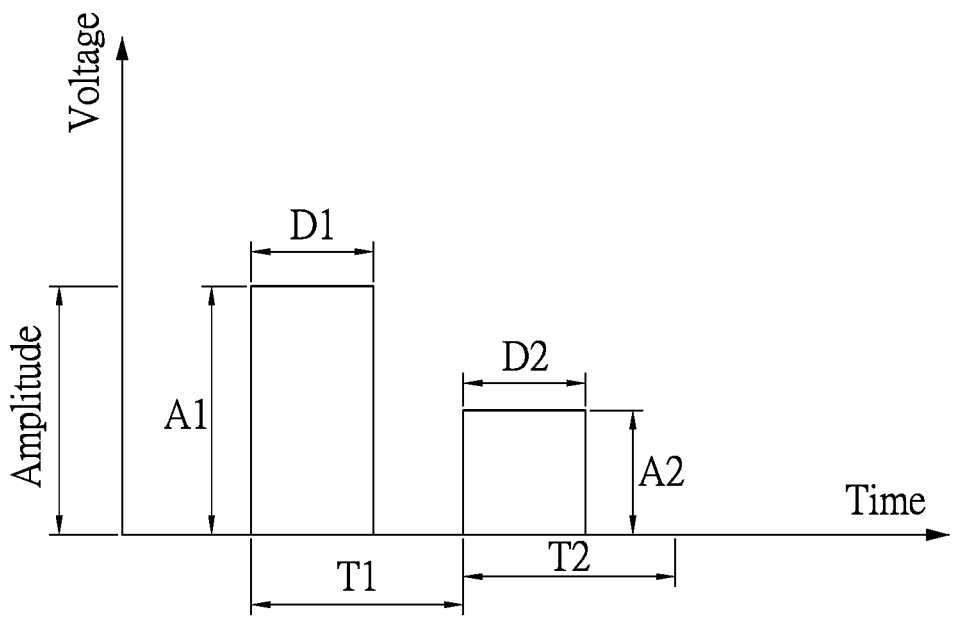
FIG. 3 shows a waveform diagram of a mixed PWM signal according to an embodiment of the instant disclosure.

At first, please refer to FIG. 3. FIG. 3 shows a waveform diagram of a mixed PWM signal according to an embodiment of the instant disclosure. In FIG. 3, the first pulse signal and the second pulse signal are both a pulse width modulation (PWM) signal. The length (or so called "period") of the first pulse is T1. The duty ratio of the first pulse is D1. The amplitude of the first pulse is A1. The length of the second pulse is T2. The duty ratio of the second pulse is D2. The amplitude of the second pulse is A2. In this embodiment, the length T1 of the first pulse signal and the length T2 of the second pulse signal are the same. In regard to step S110, the duty ratio D1 of the first pulse signal is between 0 and $2^P/N$ for representing information of P bits gray levels. In regard to step S120, the duty ratio D2 of the second pulse signal is between 0 and $2^Q/N$ for representing information of Q bits gray levels. In other words, the information of P bits gray levels is represented by the duty ratio D1 of the first pulse, and the information of Q bits gray levels is represented by the duty ratio D2 of the second pulse.

In the embodiment of FIG. 3, the amplitude A1 of the first pulse signal is different from the amplitude A2 of the second pulse signal. Especially for practical applications of controlling brightness of the LED, a preferred embodiment is setting the amplitude A2 of the second pulse signal to be smaller than the amplitude A1 of the first pulse signal, but the instant disclosure is not so restricted.

Figure 1A:
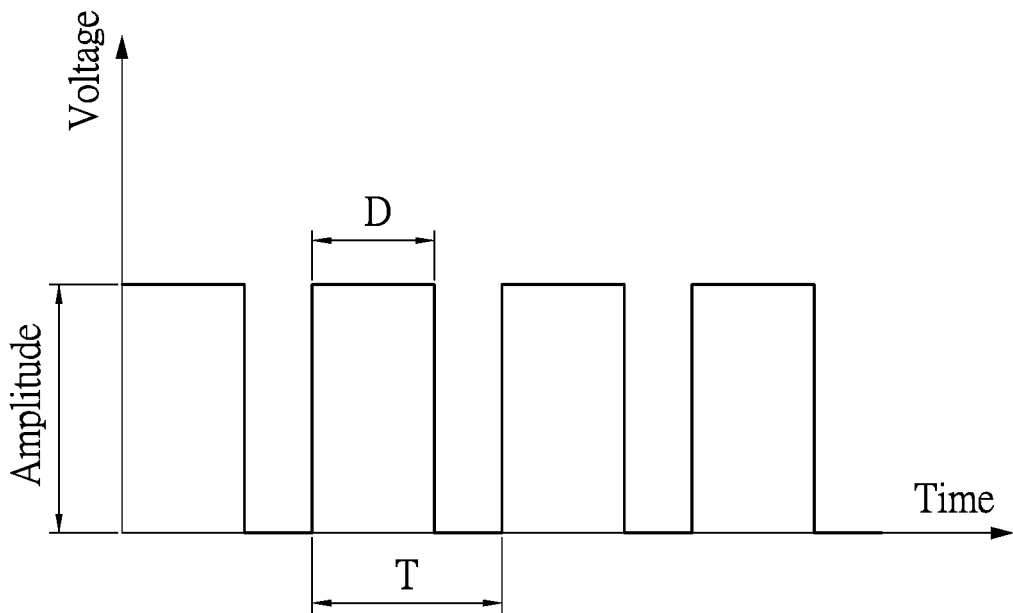
FIG. 1A shows a waveform diagram of a conventional pulse width modulation (PWM) signal for controlling dimming of an LED.
Figure 1B:
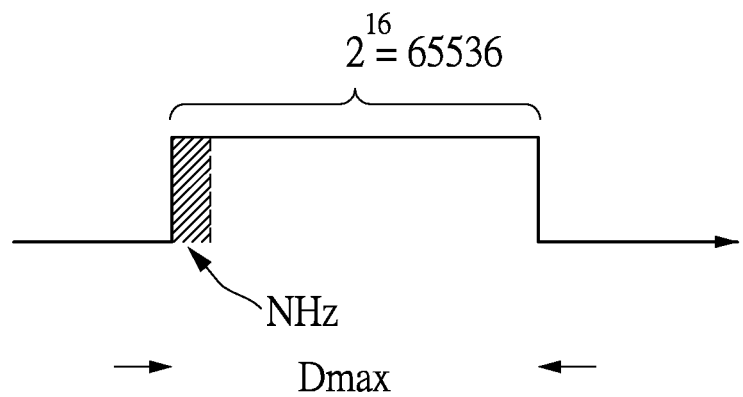
FIG. 1B shows a waveform diagram of the PWM signal shown in FIG. 1A used for illustrating 65536 gray levels.

As mentioned above, the length of the mixed pulse width modulation signal of the embodiment of FIG. 3 is T1+T2, which is $2^P/N+2^Q/N$, equal to $(2^P+2^Q)/N$. The number of the control bits is (P+Q). Referring to FIG. 1B, if 16-bits control bits are used, the length of the conventional pulse width modulation signal is 65536/N. Relatively, if the mixed pulse width modulation signal of FIG. 3 is used to replace the conventional pulse width modulation signal and setting P=8 and Q=8, it can be seen the length of the mixed pulse width modulation signal is (256+256)/N, that is 512/N. Therefore, the length of the pulse has been greatly shortened.

Figure 4:
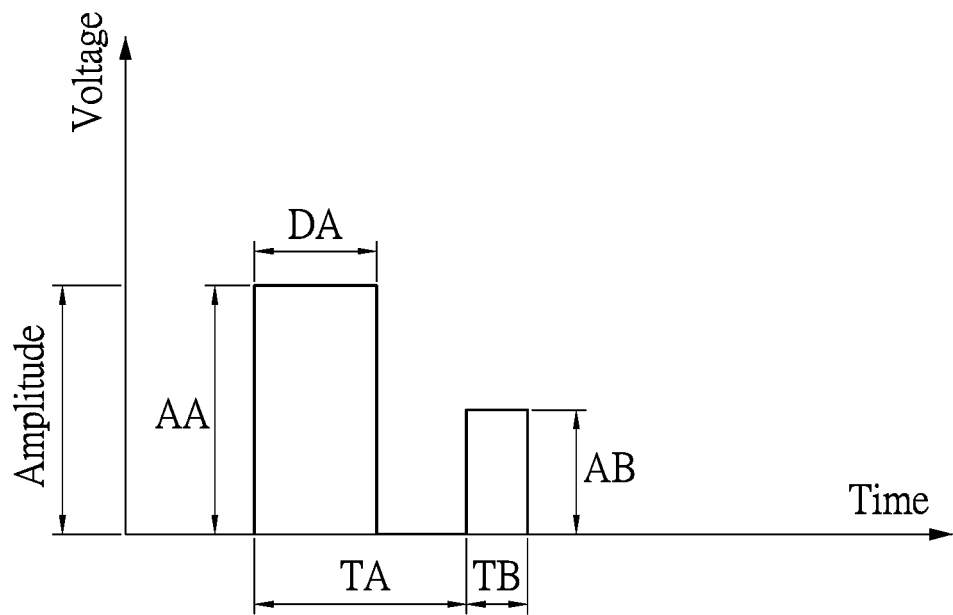
FIG. 4 shows a waveform diagram of a mixed PWM signal according to another embodiment of the instant disclosure.

Please refer to FIG. 4. FIG. 4 shows a waveform diagram of a mixed PWM signal according to another embodiment of the instant disclosure. In FIG. 4, the first pulse signal is a pulse width modulation (PWM) signal. The length TA of the first pulse signal is $2^P/N$. The duty ratio DA of the first pulse signal is between 0 and $2^P/N$ for representing information of P bits gray levels. The amplitude of the first pulse signal is fixed as a constant AA. Then, the second pulse signal is a pulse amplitude modulation (PAM) signal. The amplitude AB of the second pulse signal is between 0 and $2^Q/N$ for representing information of Q bits gray levels. The amplitude AA of the first pulse signal and the amplitude AB of the second pulse signal are not the same. A preferred embodiment is setting the amplitude AB of the second pulse signal to be smaller than amplitude AA of the first pulse signal. The length TB of the second pulse is predetermined as a constant. In other words, the information of P bits gray levels is represented by the duty ratio DA of the first pulse signal, and the information of Q bits gray levels is represented by the amplitude AB of the second pulse signal. By using the mixed pulse width modulation signal of FIG. 4 to replace the conventional pulse width modulation signal, the length of the pulse signal also can be greatly shortened.

Based on the embodiment of FIG. 4, the sequence of the first pulse signal and the second pulse signal can be exchanged. That is, the embodiment of FIG. 4 can be modified as follows. Setting the first pulse signal to be the pulse amplitude modulation (PAM) signal, the amplitude AB of the first pulse signal is between 0 and $2^P/N$ for representing information of P bits gray levels. Setting the second pulse signal to be the pulse width modulation (PWM) signal, the length TA of the second pulse signal is $2^Q/N$, the duty ratio DA of the second pulse signal is between 0 and $2^Q/N$ for representing information of Q bits gray levels. In other words, the information of P bits gray levels is represented by the amplitude AB of the first pulse signal, and the information of Q bits gray levels is represented by the duty ratio DA of the second pulse signal. In this embodiment, it is preferred to set the amplitude AA of the second pulse signal to be smaller than the amplitude AB of the first pulse signal.

If control bits (P+Q) are 16-bits, referring to FIG. 1B, the length of the conventional pulse width modulation signal is 65536/N. Relatively, when the mixed pulse width modulation signal shown in FIG. 4 is used, and setting P=8, Q=8, TB=1/N, the length of the mixed pulse width modulation signal is (256+1)/N, that is 257/N. It can be seen the length of the pulse signal has been greatly shortened.

An Embodiment of a Signal Generating Circuit for Controlling Dimming of a LED

Figure 5:
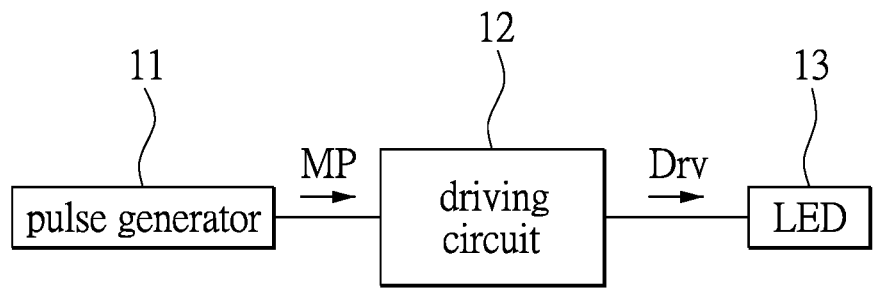
FIG. 5 shows a circuit diagram of a signal generating circuit for controlling dimming of an LED according to an embodiment of the instant disclosure.

Please refer to FIG. 5 showing a circuit diagram of a signal generating circuit for controlling dimming of an LED according to an embodiment of the instant disclosure. The signal generating circuit comprises a pulse generator 11 and a driving circuit 12. The driving circuit 12 is coupled to the pulse generator 11 and a LED 13. The pulse generator 11 is used to generate a first pulse signal and a second pulse signal after the first pulse signal. The minimum pulse-width of the pulse generator 11 is N, wherein N is an integer. The amplitude of the second pulse is different from the amplitude of the first pulse. The first pulse signal comprises information of P bits gray levels. P is also an integer. The second pulse signal comprises information of Q bits gray levels, wherein Q is an integer.

In one embodiment, the first pulse signal and the second pulse signal are both the pulse width modulation (PWM) signal. For example, referring to the embodiment of FIG. 3, the length T1 of the first pulse signal and the length T2 of the second pulse signal are the same. The duty ratio D1 of the first pulse signal is between 0 and $2^P/N$ for representing information of P bits gray levels. The duty ratio D2 of the second pulse signal is between 0 and $2^Q/N$ for representing information of Q bits gray levels.

In another embodiment, one of the first pulse signal and the second pulse signal is a pulse width modulation (PWM) signal, and the other one is a pulse amplitude modulation (PAM) signal. For example, referring to the embodiment of FIG. 4, the first pulse signal is a pulse width modulation (PWM) signal. The length TA of the first pulse signal is $2^P/N$. The duty ratio DA of the first pulse signal is between 0 and $2^P/N$ for representing information of P bits gray levels. Then, the second pulse signal is a pulse amplitude modulation (PAM) signal. The amplitude AB of the second pulse signal is between 0 and $2^Q/N$ for representing information of Q bits gray levels. It is preferred to set the amplitude AB of the second pulse signal to be smaller than the amplitude AA of the first pulse signal.

In still another embodiment, if the first pulse and the second pulse are exchanged, the first pulse signal becomes the pulse amplitude modulation (PAM) signal, and the second pulse signal becomes the pulse width modulation (PWM) signal. The amplitude AB of the first pulse signal is between 0 and $2^P/N$ for representing information of P bits gray levels. The length of the second pulse signal is $2^Q/N$, the duty ratio of the second pulse signal is between 0 and $2^Q/N$ for representing information of Q bits gray levels. In this embodiment, it is preferred to set the amplitude AA of the second pulse signal to be smaller than the amplitude AB of the first pulse signal.

Refer to FIG. 5 again. The driving circuit 12 controls gray levels of the LED 13 according to the gray levels information MP represented by the first pulse signal and the second pulse signal. The driving circuit 12 generates a driving signal Drv to control the brightness of the emitted light of the LED 13 according to the received first pulse signal and the second pulse signal (gray levels information MP).

According to above descriptions, the provided signal generating method and the circuit for controlling dimming of the LED utilize the concept of dividing the amplitude and the duty ratio of the conventional pulse width modulation signal to generate a mixed pulse width modulation signal. Accordingly, by combining two types of pulse signals to generate a mixed pulse width modulation signal, the length of the pulse signal can be greatly shortened, wherein the duty ratio or the amplitude of two types of pulse signal is available to be selected for representing information of the control bits.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A signal generating method for controlling dimming of an LED, comprising:
   generating a first pulse signal, the first pulse signal comprising information of P bits gray levels, P being an integer, wherein the minimum pulse-width of the first pulse is N, N is an integer;
   generating a second pulse signal after the first pulse signal, the second pulse signal comprising information of Q bits gray levels, Q being an integer, wherein the amplitude of the second pulse signal is different from the amplitude of the first pulse signal, the minimum pulse-width of the second pulse is the same as the minimum pulse-width of the first pulse; and
   utilizing the first pulse signal and the second pulse signal to represent gray levels information of the LED;
   wherein the duty ratio of the first pulse signal is between 0 and $2^P/N$ for representing information of P bits gray levels, the duty ratio of the second pulse signal is between 0 and $2^Q/N$ for representing information of Q bits gray levels.

2. The signal generating method for controlling dimming of an LED according to claim 1, wherein the resolution of the gray levels information of the LED is higher than P bits or Q bits, but lower than or equal to P+Q bits.

3. The signal generating method for controlling dimming of an LED according to claim 1, wherein the first pulse signal and the second pulse signal are pulse width modulation (PWM) signals.

4. The signal generating method for controlling dimming of an LED according to claim 3, wherein the length of the first pulse signal and the length of the second pulse signal are the same.

5. The signal generating method for controlling dimming of an LED according to claim 1, wherein the amplitude of the second pulse signal is smaller than the amplitude of the first pulse signal.

6. The signal generating method for controlling dimming of an LED according to claim 1, wherein the first pulse signal is a pulse width modulation (PWM) signal, the length of the first pulse signal is $2^P/N$, the duty ratio of the first pulse signal is between 0 and $2^P/N$ for representing information of P bits gray levels, the second pulse signal is a pulse amplitude modulation (PAM) signal, the amplitude of the second pulse signal is between 0 and $2^Q/N$ for representing information of Q bits gray levels.

7. The signal generating method for controlling dimming of an LED according to claim 1, wherein the first pulse signal is a pulse amplitude modulation (PAM) signal, the amplitude of the first pulse signal is between 0 and $2^P/N$ for representing information of P bits gray levels, the second pulse signal is a pulse width modulation (PWM) signal, the length of the second pulse signal is $2^Q/N$, the duty ratio of the second pulse signal is between 0 and $2^Q/N$ for representing information of Q bits gray levels.

8. A signal generating circuit for controlling dimming of an LED, comprising:
   a pulse generator, generating a first pulse signal and a second pulse signal after the first pulse signal, the minimum pulse-width of the pulse generator being N, N being an integer, the first pulse signal comprising information of P bits gray levels, P being an integer, the second pulse signal comprising information of Q bits gray levels, Q being an integer, wherein the amplitude of the second pulse signal is different from the amplitude of the first pulse signal; and
   a driving circuit, coupled to the pulse generator, controlling gray levels of the LED according to gray levels information represented by the first pulse signal and the second pulse signal;
   wherein the duty ratio of the first pulse signal is between 0 and $2^P/N$ for representing information of P bits gray levels, the duty ratio of the second pulse signal is between 0 and $2^Q/N$ for representing information of Q bits gray levels.

9. The signal generating circuit for controlling dimming of an LED according to claim 8, wherein the resolution of the gray levels information of the LED is higher than P bits or Q bits, but lower than or equal to P+Q bits.

10. The signal generating circuit for controlling dimming of an LED according to claim 8, wherein the first pulse signal and the second pulse signal are pulse width modulation (PWM) signals.

11. The signal generating circuit for controlling dimming of an LED according to claim 8, wherein the length of the first pulse signal and the length of the second pulse signal are the same.

12. The signal generating circuit for controlling dimming of an LED according to claim 8, wherein the amplitude of the second pulse signal is smaller than the amplitude of the first pulse signal.

13. The signal generating circuit for controlling dimming of an LED according to claim 8, wherein the first pulse signal is a pulse width modulation (PWM) signal, the length of the first pulse signal is $2^P/N$, the duty ratio of the first pulse signal is between 0 and $2^P/N$ for representing information of P bits gray levels, the second pulse signal is a pulse amplitude modulation (PAM) signal, the amplitude of the second pulse signal is between 0 and $2^Q/N$ for representing information of Q bits gray levels.

14. The signal generating circuit for controlling dimming of an LED according to claim 8, wherein the first pulse signal is a pulse amplitude modulation (PAM) signal, the amplitude of the first pulse signal is between 0 and $2^P/N$ for representing information of P bits gray levels, the second pulse signal is a pulse width modulation (PWM) signal, the length of the second pulse signal is $2^Q/N$, the duty ratio of the second pulse signal is between 0 and $2^Q/N$ for representing information of Q bits gray levels.

\* \* \* \* \*